United States Patent
Pfeffer et al.

(10) Patent No.: US 7,147,276 B2
(45) Date of Patent: Dec. 12, 2006

(54) INTERIOR LINING PART

(75) Inventors: Jiri Pfeffer, Prestice (CS); Tomas Chlouba, Prestice (CS)

(73) Assignee: Lear Corporation, Southfield, MI (US)

( * ) Notice: Subject to any disclaimer, the term of this patent is extended or adjusted under 35 U.S.C. 154(b) by 179 days.

(21) Appl. No.: 10/934,651

(22) Filed: Sep. 3, 2004

(65) Prior Publication Data

US 2005/0231006 A1    Oct. 20, 2005

(30) Foreign Application Priority Data

Sep. 4, 2003    (DE)    ................... 203 13 770

(51) Int. Cl.
*B60J 7/00*    (2006.01)
(52) U.S. Cl. ..................... 296/214; 296/39.1
(58) Field of Classification Search ............... 296/214, 296/39.1
See application file for complete search history.

(56) References Cited

U.S. PATENT DOCUMENTS

| | | |
|---|---|---|
| 4,428,170 A | 1/1984 | Wooten et al. |
| 4,741,945 A | 5/1988 | Brant et al. |
| 4,923,245 A * | 5/1990 | Kuwabara ................... 296/214 |
| 5,108,147 A * | 4/1992 | Grimm et al. .............. 296/214 |
| 5,280,991 A | 1/1994 | Weiland |
| 5,833,304 A | 11/1998 | Daniel et al. |
| 6,161,895 A | 12/2000 | Jaeckle et al. |
| 6,353,831 B1 * | 3/2002 | Gustman ................ 707/103 R |
| 6,475,937 B1 | 11/2002 | Preisler et al. |
| 6,523,887 B1 | 2/2003 | Picken et al. |
| 2003/0021956 A1 | 1/2003 | Preisler et al. |

OTHER PUBLICATIONS

Interior Lining Part Drawing, undated.

* cited by examiner

*Primary Examiner*—Joseph D. Pape
(74) *Attorney, Agent, or Firm*—MacMillan, Sobanski & Todd, LLC

(57) ABSTRACT

An interior lining part, in particular a roof liner for a vehicle, includes at least a relatively dimensionally stable core layer and a decorative layer facing the interior of the vehicle as well as a reinforcing profile extending at least partially essentially along an edge of the interior lining part. The core layer and the decorative layer exhibit bent over end sections for the formation of the edge. The reinforcing profile exhibits at least a first profile section running essentially in the direction of the end section of the core layer and a second profile section extending outwards from it.

4 Claims, 1 Drawing Sheet

_(1)_

INTERIOR LINING PART

CROSS REFERENCE TO RELATED APPLICATIONS

This application claims priority to German Patent Application No. 20313770.1 filed Sep. 4, 2003, the disclosures of which are incorporated herein by reference.

BACKGROUND OF THE INVENTION

The invention relates to an interior lining part, in particular a roof liner for a vehicle, consisting of at least a relatively dimensionally stable core layer and a decorative layer facing the vehicle interior as well as a reinforcing profile section extending at least essentially along an edge of the interior lining part, whereby the core layer and decorative layer exhibit end sections which are bent over to form the edge.

SUMMARY OF THE INVENTION

Such an interior lining part is known from practice for various parts of a vehicle, such as for example for the lining of columns, the lining of the vehicle doors, as a rear shelf or in particular as a roof liner. The interior lining part exhibits at least two layers, whereby one of the layers is a relatively dimensionally stable core layer and another layer is a decorative layer facing the vehicle interior. The core layer can be formed from a foam material, which has been brought into a desired shape and then, or also in one working step, joined to the decorative layer. The decorative layer is at least on its face surface formed from a relatively soft material, whereby suitable materials for such decorative layers are essentially known.

Along one edge of the interior lining part the core layer and decorative layer are bent over and exhibit here appropriate end sections. In order to design the interior lining part in the region of the edge sufficiently strongly in this respect, a reinforcing profile extends at least partly along such an edge.

The object of the invention is to improve an interior lining part as mentioned at the beginning such that the edge both in the longitudinal direction of the edge and also essentially transverse to it is reinforced, away from the interior lining part, in a constructively simple manner.

This object is solved by the features of claim 1.

According to the invention, the interior lining part exhibits a reinforcing profile which exhibits at least a first profile section running essentially along the end section of the core layer and a second profile section extending outwards from it. A reinforcement, essentially in the longitudinal direction of the edge, is produced by the first profile section. Due to the extension of the first profile section along the core-layer end section and its opposing location, strengthening of the edge occurs which is supported by an appropriate joint between the first profile section and the core-layer end section. However, to also reinforce and strengthen the edge transverse to the longitudinal direction of the edge, the second profile section extends outwards, i.e. approximately transverse to the extension direction of the core-layer end section. Here, the second profile section can extend up to the decorative-layer end section or even protrude into it.

Also an appropriate joint between the second profile section and the core-layer end section and/or decorative-layer end section can be provided.

In order to arrange the edge visually advantageously, the end section of the decorative layer can exhibit a bead section which at least covers a free end of the core-layer end section. Since a corresponding edge of the interior lining part generally runs in the direction of the body, a simple and visually advantageous covering of the core layer is provided also at the free end of the corresponding end section by this bead section.

In this respect, to improve the covering of the core-layer end section and to arrange it more securely, the bead section can extend to the inner side of the core-layer end section and the reinforcing profile can be arranged at least partly and/or in places between both of them. Through this arrangement of the bead section essentially a sandwich structure is produced from the core layer, reinforcing profile and decorative layer, whereby all three are joined together in an appropriate manner.

At this point it should be noted that various methods are conceivable for joining the core layer, reinforcing profile and decorative layer. For example, the relevant parts can be joined together by an adhesive. There is also the possibility, in addition or as an alternative to such an adhesive, to soften one of these constituents through the effect of heat or optionally pressure at least so far that a suitable joint is produced between the constituents after cooling and hardening again.

To reinforce the interior lining part essentially in the transverse direction of the edge, there is the possibility that the corresponding second profile section extends into the core-layer end section where it is joined to it. In this regard, the second profile section can, for example, only protrude from the first profile section at certain places, so that a claw or finger-type engagement in the core-layer end section is possible. However, in order to change the body structure of the core layer as little as possible and to obtain reinforcement particularly in the region of the free end of the edge, the second profile section can at least partially cover the free end of the end section of the core layer and be arranged between the core layer and the bead section.

The edge of the interior lining part can also border a suitable opening in it, whereby the edge can be an opening edge, in particular bordering a sun-roof opening. Adequate reinforcement of the interior lining part is of advantage especially in the region of such a sun-roof opening, because the corresponding edge is relatively exposed and increased stresses occur during closing and opening of the sun roof due to its movement or also due to the interaction of a passenger.

In particular for a smooth interface of the bead section on the reinforcing profile from outwards, it may be considered an advantage if the second profile section is joined to the first profile section via a joint bend. A joint, both to the core-layer end section and to the bead section, can be produced in a simple manner along this joint bend. However, bordering of the second profile section relative to the first is also possible, whereby an edge line is formed in this region, which however is arranged on an inner side of the interior lining part so that the visual impression of the interior lining part is not negatively affected.

In order to reinforce the appropriate edge of the interior lining part not just at its free end, but also in particular at the transition to the rest of the interior lining part, the first profile section can be joined at its end facing away from the second profile section to a third profile section which essentially extends along an inner side of the core layer outside of the edge. This can also be joined to the first profile section by means of a suitable joint bend.

A reinforcing profile which is easy to produce can be seen in that it is formed in an approximate Z-shape. In this regard, the second and third profile sections form the top and bottom legs, whereas the first profile section forms the Z-joining leg, extending approximately vertical.

The reinforcing profile can be formed as a single profile. However, it may prove to be of advantage if the interior lining part is reinforced or stiffened at further points, particularly if it is of a relatively large area. This can, for example, be achieved by an appropriate reinforcing frame of the interior lining part. With one embodiment according to the invention, the reinforcing profile can in this connection be part of such a reinforcing frame.

As materials for the reinforcing profile and/or reinforcing frame, appropriate plastics are conceivable, whereby the use of an appropriate metal is also possible.

In order to facilitate a smooth and ripple-free seating of the bead section on the rest of the interior lining part, at least a free end of the second profile section can be arranged recessed in the free end of the end section of the core layer. The recess occurs here particularly in the manner that the free end of the second profile section is arranged flush in the free end of the end section of the core layer. This means that the bead section can be seated smoothly at both free ends so that no unevenness occurs in this region.

Particularly with the formation of the second profile section only in certain places, it has proven to be a further advantage in this respect if the second profile sections are recessed not just at their free end, but are completely recessed in the core-layer end section and are in particular arranged flush with it.

Several possibilities are conceivable in the manner in which and at the time at which the arrangement of the reinforcing profile occurs relative particularly to the core layer.

With one method the reinforcing profile can be joined to the core layer during the forming of the core layer. Consequently, no separate joint between the two constituent parts need be formed at a later point in time.

In particular in this connection it is also advantageous to consider the reinforcing profile as being part of the forming of the core layer. This means that the reinforcing profile is for example set into a suitable press or similar device in which then at least the core layer of the interior lining part is formed with the required shape. At the same time, the decorative layer can also be arranged in such a press.

Another possibility can be seen in that the reinforcing profile can be arranged between the core layer after the core layer is formed and the bead section and can be joined to them both.

A compromise between an adequately good joint between the bead section and the reinforcing profile and material saving can be obtained if the bead section extends along the first and second profile sections up to approximately the third profile section, but with the third profile section remaining free.

In this connection it is also favourable if the bead section exhibits a thinner layer thickness relative to the rest of the decorative layer. This is possible, because the bead section has no function in respect of a passenger and in particular does not have to provide a cushioning effect when touched and shows advantageous visual properties also with appropriate joining of the decorative layer and the core layer in the region of the edge.

In order to reinforce or stiffen the edge, particularly in the region of a sun-roof opening over its complete length, a length of the reinforcing profile can essentially correspond to the depth of the sun-roof opening.

Even if in the above essentially a core layer and a decorative layer have always been mentioned, then it is taken for granted that the core layer and/or decorative layer can exhibit two or more single layers. In particular the core layer is with many interior lining parts composed of several layers, whereby one layer can for example be a foam layer and another layer can be a fibre layer reinforced with appropriate plastic. There is also the possibility that the core layer is formed from only one such plastic-reinforced fibre layer, which in particular can be recycled.

An advantageous embodiment of the invention is described in more detail in the following in the figures provided in the drawing.

BRIEF DESCRIPTION OF THE DRAWINGS

Various objects and advantages of this invention will become apparent to those skilled in the art from the following detailed description of the preferred embodiment, when read in light of the accompanying drawings.

DETAILED DESCRIPTION OF THE INVENTION

Figure 1:
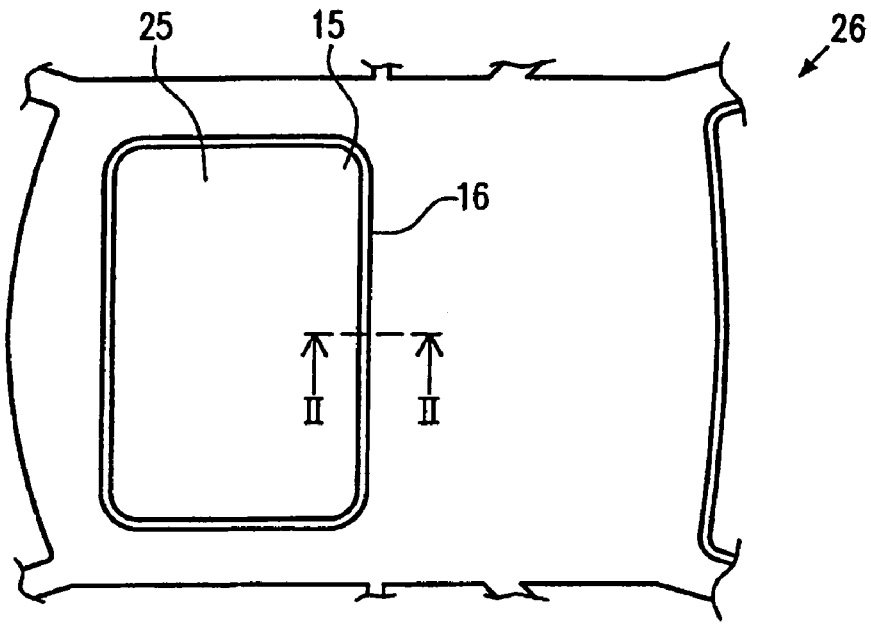
FIG. 1 a plan view of a vehicle roof with sun roof.

FIG. 1 shows a partial plan view of a vehicle 26, in particular in the region of a vehicle roof. In this vehicle roof a sun-roof opening 15 for a sun roof 25 is formed, whereby the sun-roof opening 15 is bordered by an opening edge 16 of an appropriate interior lining part 1, see also FIG. 2.

Figure 2:
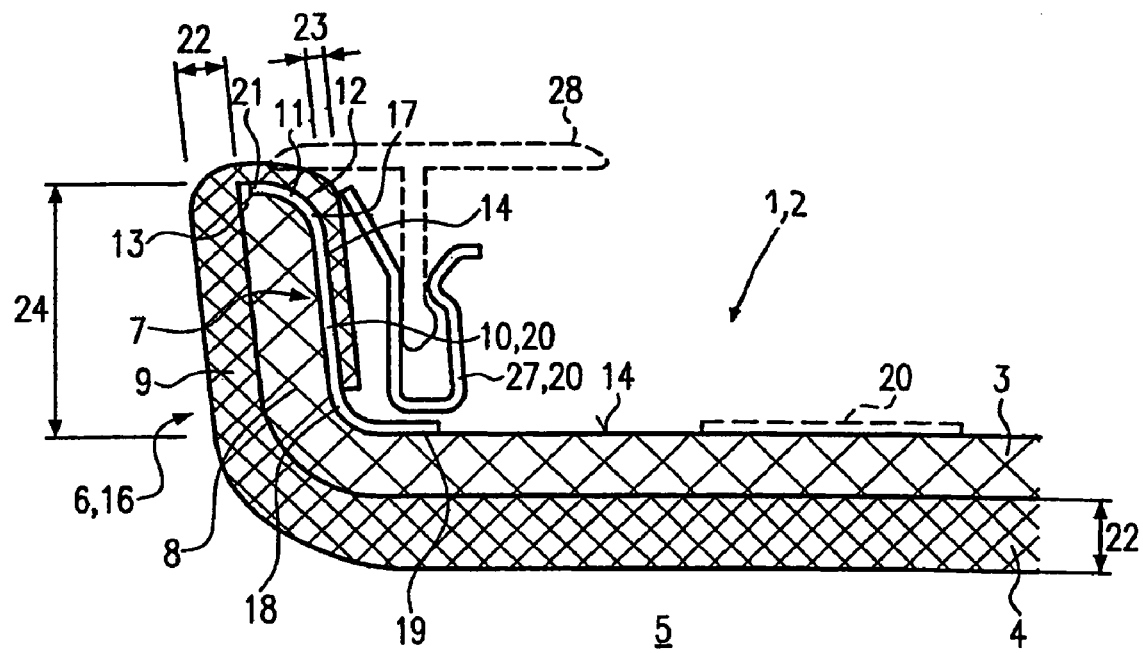
FIG. 2 a cross-section along the line II—II in FIG. 1.

A cross-section along the line II—II in FIG. 1 is shown in FIG. 2. The interior lining part 1 in the shape of a roof liner 2 exhibits a core layer 3 and a decorative layer 4. These extend below a body roof not shown in FIG. 2 and exhibit bent-over end sections 8, 9 in the region of the sun-roof opening 15 for the formation of an edge 6 or opening edge 16. The bent-over end sections 8, 9 of the core layer 3 and decorative layer 4 extend approximately in the vertical direction with the embodiment according to FIG. 1, whereas the core layer 3 and the decorative layer 4 run otherwise horizontally.

The decorative layer 4 faces the interior 5 of a vehicle and is generally formed from a layer of appropriate material which feels soft to the touch and which gives a visually advantageous effect.

The layers 3, 4 are joined together, whereby the core layer 3 is formed relatively dimensionally stable, but flexes with the impact of a passenger.

In the region of the edge 6 or of the opening edge 16 a reinforcing profile 7 is arranged on an inner side 14 of the interior lining part 1. This exhibits a first profile section 10 and a second profile section 11 as well as a third profile section 19. The first profile section 10 extends along the end section 8 of the core layer 3 and is joined via appropriate joint bends 17 to the second and third profile sections. The third profile section 19 is arranged at an end 18 of the first profile section 10 facing away from the second profile section 11 and extends on the inner side 14 of the core layer 3 in the horizontal region of the interior lining part 1. The second profile section 11 covers a free end 13 of the core-layer end section 8 and extends with its free end 21 almost up to the vertically running decorative-layer end section 9. The free end 21 of the second profile section 11 is arranged recessed to be flush in the free end 13 of the corresponding end section 8 of the core layer 3. The corresponding profile sections, 10, 11 and 19 produce an approximate Z-shaped reinforcing profile 7. This reinforcing profile 7 can be arranged as a single component, but can also be part of a reinforcing frame 20. In FIG. 2 a part of this reinforcing frame 20 extending in the horizontal region of the interior lining part 1 is shown. Appropriate clips 27, which provide attachment of the interior lining part 1 to clipping devices 28 arranged on the body of the vehicle 26, can be arranged on the reinforcing frame 20 or on the reinforcing profile 7.

The end section 9 of the decorative layer 4 exhibits a bead section 12 which surrounds the free end 13 of the core-layer end section 8 and which extends approximately to the third profile section 19. The first profile section 10 and the second profile section 11 are arranged here between the bead section 12 and the core-layer end section 8. An appropriate layer thickness 23 of the bead section 12 is thinner than the layer thicknesses 22 of the decorative layer 4, extending in the horizontal direction and of the end section 9 of the decorative layer 4 extending in the vertical direction. A length 24 of the reinforcing profile 7 in the vertical direction corresponds essentially to a corresponding depth in the sun-roof opening 15, see in particular FIG. 2.

Due to the special formation of the reinforcing profile, stiffening or reinforcement of the interior lining part occurs, particularly in the region of the free end 13 of the core layer. Consequently, together with the first profile section both in the vertical direction according to FIG. 2 and in the horizontal direction, a reinforcement or stiffening of the interior lining part in the region of the edge is achieved; refer in this respect also to the third profile section 19. At the same time, due to the arrangement of the reinforcing profile, rippling of the decorative layer in this section is avoided and a secure circumferential placement and attachment of the bead section is ensured in a simple manner. In this respect, it is sufficient if the second profile section of the reinforcing profile is formed just in certain places so that it for example grips in a claw or finger-shaped manner the free end 13 of the core-layer end section at least partially. This applies analogously to the arrangement of the third profile section 19, whereby both the second and the third profile sections can also extend along the whole opening edge.

The invention claimed is:

1. An interior lining part comprising:
   a core layer including an end section having a first side, a second side, and a free end;
   a reinforcing profile having a first profile section and a second profile section having a free end, said first profile section being disposed adjacent said first side of said end section of said core layer, said second profile section extending at least partially about said free end of said end section of said core layer; and
   a decorative layer having an end section and a bead section extending from said end section, said end section of said decorative layer being disposed adjacent said second side of said end section of said core layer, said bead section surrounding said free end of said second profile section of said reinforcing profile.

2. The interior lining part defined in claim 1 wherein said bead section surrounds at least a portion of said first profile section of said reinforcing profile.

3. The interior lining part defined in claim 1 wherein said bead section of said decorative layer has a thickness less than the thickness of the other portions of said decorative layer.

4. The interior lining part defined in claim 1 wherein said free end of said second profile section is arranged to be recessed flush within said free end of said end section of said core layer.

* * * * *